US010963490B2

(12) United States Patent
Hasegawa et al.

(10) Patent No.: US 10,963,490 B2
(45) Date of Patent: Mar. 30, 2021

(54) TEXT EXTRACTION AND PROCESSING

(71) Applicant: International Business Machines Corporation, Armonk, NY (US)

(72) Inventors: Tohru Hasegawa, Tokyo (JP); Hiroaki Uetsuki, Tokyo (JP); Shunsuke Ishikawa, Tokyo (JP); Issei Yoshida, Tokyo (JP); Asako Ono, Tokyo (JP); Yasuyuki Tominaga, Saitama (JP); Kenta Watanabe, Saitama (JP); Hiroaki Kikuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/287,323

(22) Filed: Feb. 27, 2019

(65) Prior Publication Data

US 2020/0272648 A1 Aug. 27, 2020

(51) Int. Cl.
*G06F 7/00* (2006.01)
*G06F 16/31* (2019.01)
*G06N 5/02* (2006.01)
*G06F 16/93* (2019.01)

(52) U.S. Cl.
CPC .......... *G06F 16/313* (2019.01); *G06F 16/93* (2019.01); *G06N 5/02* (2013.01)

(58) Field of Classification Search
CPC .......... G06F 16/313; G06F 16/93; G06N 5/02
USPC .................................. 707/600–899
See application file for complete search history.

(56) References Cited

U.S. PATENT DOCUMENTS

| 8,510,312 B1* | 8/2013 | Thibaux .................. G06F 16/93 |
| | | 707/748 |
| 8,812,508 B2 | 8/2014 | Zhang et al. |
| 9,116,895 B1 | 8/2015 | Eveland et al. |
| 9,292,494 B2 | 3/2016 | Ceusters et al. |
| 9,390,161 B2 | 7/2016 | Shehata et al. |

* cited by examiner

*Primary Examiner* — Isaac M Woo
(74) *Attorney, Agent, or Firm* — Lieberman & Brandsdorfer, LLC

(57) ABSTRACT

A system, computer program product, and method are provided to selectively index one or more subsets of documents or files. As data is extracted from a document or file, extracted text is organized into data portions and subject to evaluations. Meta characteristic data is leveraged to assess the extracted text. One or more subsets of the organized data portions are selectively identified and subject to enrichment processing, which creates and returns enriched and indexed subsets of the documents or files.

18 Claims, 9 Drawing Sheets

TEXT EXTRACTION AND PROCESSING

BACKGROUND

The present embodiment(s) relate to document processing. More specifically, the embodiment(s) relate to an intelligence platform to enhance text identification and extraction by prioritizing aspects of the document(s) and conducting enrichment activity responsive to the prioritization.

With an abundant quantity of data available in large pools of data, such as document repositories, searching and finding relevant data is challenging. Data exploration is recognized as an initial or preliminary step in data analysis directed at a pool of data, and typically involves summarizing data characteristics by uncovering initial patterns, characteristics, and points of interest. A combination of manual methods and automated tools, such as data visualizations, charts, and initial reports, are commonly employed to support data exploration. After data exploration is complete, further data evaluation in the form of data discovery may be conducted.

For a system or search engine that supports word searching, a file is ingested, text is extracted from the ingested file, and the extracted word is subject to enrichment, and followed by indexing. There are concerns or drawbacks associated with text extraction when the corresponding document or file is large. Namely, enrichment and indexing require a large amount of processor or memory usage, and the time required to make the corresponding file searchable is considerably long. For example, when the file to be ingested is several gigabytes, e.g. GBs, text extraction requires several minutes for completion, while text enrichment and indexing requires several hours to be completed. Another drawback of text extraction from a large file is the size of the index. Namely, the index corresponding to the file is proportional to the file size, and the time to search the index increases proportionally with the increasing size of the index. For example, a document may appear in a search result because the document has a large number of words that match the query parameters, but the document may contain meaningless information.

Prior art data exploration tools may place a limit on the file size. For example, it is known in the art to terminate text extraction when the file size is beyond a set quantity of characters, e.g. quantity of characters, or in one embodiment, not conduct data extraction on a file larger than a set size, e.g. quantity of bytes. However, such solutions merely disregard large files for extraction, and do not consider the value of the data that may be present within the large file. Prior art data exploration tools may employ index pruning for reducing the size of the index and increasing search performance by removing what it considers to be low value words. Pruning can be conducted statically, e.g. in advance of the query execution, or dynamically, e.g. during query execution. However, index pruning does not address or resolve CPU and memory resources required for enrichment and indexing extracted text from an ingested file. Accordingly, there is a need to resolve the limitations present in data exploration that supports efficient and effective processing of files regardless of the corresponding file size.

SUMMARY

The embodiments include a system, computer program product, and method for document processing, including selectively identifying and subjecting portions of a document to enrichment and indexing.

In one aspect, a computer system is provided with a processing unit operatively coupled to a memory, and a knowledge engine operating coupled to the processing unit and memory. The knowledge engine is configured with tools in the form of a manager and a director configured with functionality to support document enrichment and indexing. The manager is configured to extract textual data from a document or file, identify data portions within the extracted textual data, and assess a score for each of the identified data portions. The director is configured to leverage the assessed score to execute enrichment processing of an identified subset. An indexed subset of one or more data portions is created and returned from the director after execution of the enrichment processing.

In another aspect, a computer program product is provided to process textual data. The computer program product is provided with a computer readable storage device having embodied program code. The program code is executable by the processing unit with functionality to support document enrichment and indexing. Program code is provided to extract textual data from a document or file, identify data portions within the extracted textual data, and assess a score for each of the identified data portions. Program code is also provided to leverage the assessed score and execute enrichment processing of an identified subset. An indexed subset of one or more data portions is created and returned after execution of the enrichment processing.

In yet another aspect, a method is provided for processing textual data, including document enrichment and indexing. Textual data is extracted from a document or file, data portions within the extracted textual data are identified, and a score for each of the identified data portions is assessed. The assessed score is leveraged to support and enable execution of enrichment processing of an identified subset. An indexed subset of one or more data portions is created and returned after execution of the enrichment processing.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In Information Technology (IT), text is a human-readable sequence of characters. Words formed from the text can be encoded into computer readable formats. Text is distinguished from non-character encoded data, e.g. objects, such as graphic images and the words. A document is formed from textual information, which in one embodiment may be in an electronic form and stored in a computer as one or more files. It is recognized in the art that the document may be comprised of one or more sentences of contiguous text. For example, a word processing application recognizes a hierarchy of textual components starting with characters, organized into one or more words, which may be organized into one or more sentences, which may be organized into one or more paragraphs, organized into one or more chapters or sections of a documents, etc. Accordingly, documents are understood to constitute chapters and/or sections, each having a hierarchical arrangement of paragraphs.

Figure 1:
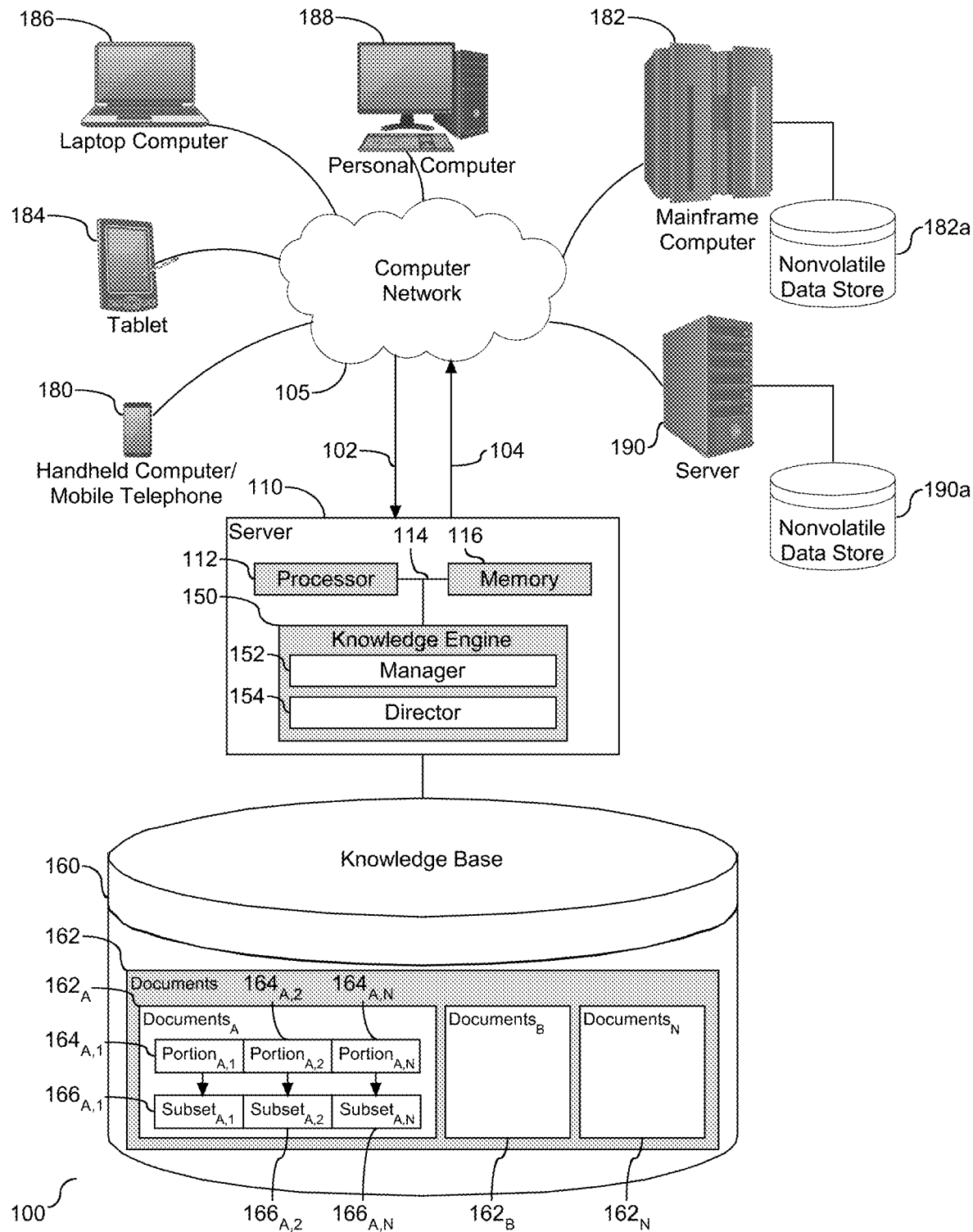
FIG. 1 depicts a system diagram illustrating a schematic diagram of a computer system and embedded tools to support document processing and indexing.

Referring to FIG. 1, a computer system (100) is provided with tools to support document processing and indexing. As shown, a server (110) is provided in communication with a plurality of computing devices (180), (182), (184), (186), and (188) across a network connection (105). The server (110) is configured with a processing unit (112) operatively coupled to memory (114) across a bus (116). A tool in the form of a knowledge engine (150) is shown local to the server (110), and operatively coupled to the processing unit (112) and/or memory (114). As shown, the knowledge engine (150) contains one or more tools (152)-(154) to provide document processing and indexing over the network (105) from one or more computing devices (180), (182), (184), (186) and (188). More specifically, the computing devices (180), (182), (184), (186), and (188) communicate with each other and with other devices or components via one or more wires and/or wireless data communication links, where each communication link may comprise one or more of wires, routers, switches, transmitters, receivers, or the like. In this networked arrangement, the server (110) and the network connection (105) may enable document processing and indexing for one or more content users. Other embodiments of the server (110) may be used with components, systems, sub-systems, and/or devices other than those that are depicted herein.

The tools, including the knowledge engine (150), or in one embodiment, the tools embedded therein including a manager (152) and a director (154), may be configured to receive input from various sources, including but not limited to input from the network (105), and a knowledge base (160). In one embodiment, the knowledge base (160) includes a plurality of documents of files represented herein as documents$_A$ ($162_A$), documents$_B$ ($162_B$), and documents$_N$ ($162_N$), hereinafter referred to collectively as documents. Although only three documents are shown in the knowledge base (160), the quantity may vary and as such the quantity shown herein should not be considered limiting. Similarly, in one embodiment, the knowledge base (160) functions as a corpus of structured or unstructured data.

The various computing devices (180), (182), (184), (186), and (188) in communication with the network (105) demonstrate access points for content creators and content users. Some of the computing devices may include devices for a database storing the corpus of data as a body of information used by the knowledge engine (150), and in one embodiment the tools (152)-(154), to create indexed subsets of one or more data portions of a document or file. The network (105) may include local network connections and remote connections in various embodiments, such that the knowledge engine (150) and the embedded tools (152)-(154) may operate in environments of any size, including local and global, e.g. the Internet. Accordingly, the server (110) and the knowledge engine (150) serve as a front-end system, with the knowledge base (160) and document(s) ($162_A$)-($162_N$) serving as the back-end system.

As shown, the knowledge base (160), which functions as a data store, is operatively coupled to the server (110). Content users may access the system via API administration or orchestration platforms, as shown and described in FIG. 2.

As described in detail below, the server (110) and the knowledge engine (150) processes documents and selectively subject portions, e.g. subsets, of the document to enrichment and indexing. The knowledge engine (150), also referred to herein as an information handling system, utilizes the manager (152) and the director (154) to selectively subject portions of the document(s) to enrichment and processing. Though shown as being embodied in or integrated with the server (110), the knowledge engine (150) may be implemented in a separate computing system (e.g., 190) that is connected across the network (105) to the server (110). Wherever embodied, the manager (152) and the director (154) are utilized to manage and process document data, and more specifically, to selectively identify and prioritize a subset of the document, and subject the subset to enrichment and indexing. As shown, the knowledge engine (150) is shown operatively coupled to the data store (160), shown herein with one or more documents ($162_A$)-($162_N$). Although shown local to the server (110), tools (152)-(154) may collectively or individually be embedded in memory (116).

Figure 3A:
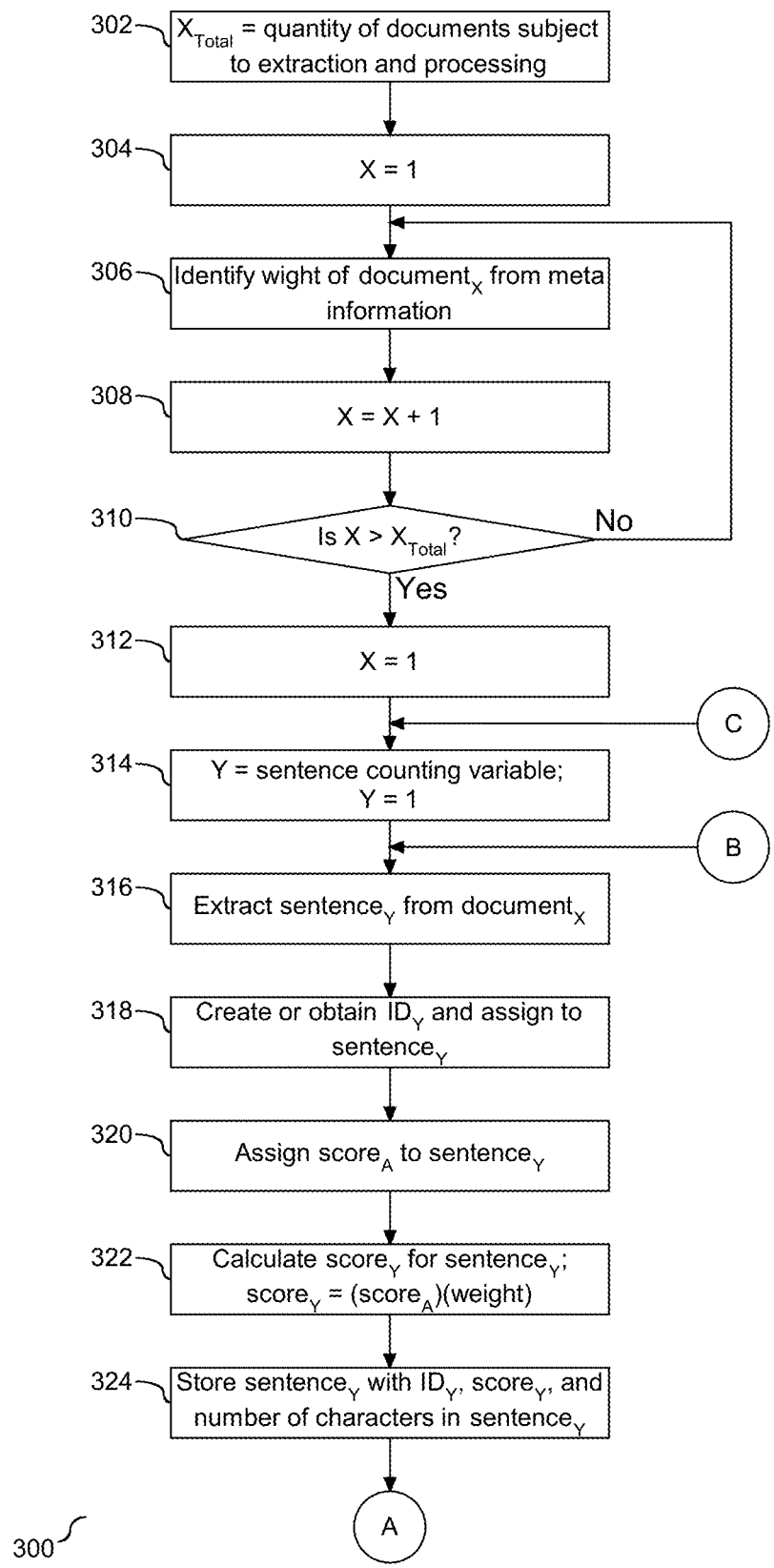
FIGS. 3A and 3B together depict a flow chart illustrating a flow chart demonstrating text extraction and processing of the extracted text.
Figure 3B:
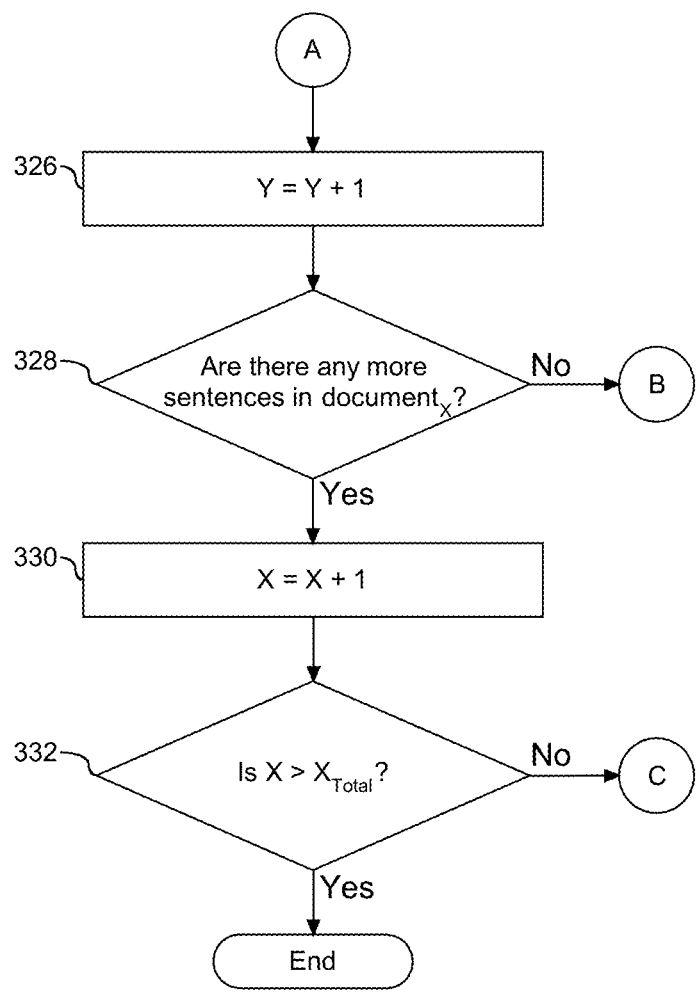

It is understood in the art that documents contain data, including textual data and in one embodiment non-textual data. The manager (152) functions to extract data in the form of text from one or more documents, such as document$_A$ ($162_A$). The extracted text is recognized as a compilation or grouping of data portions. The manager (152) subjects the extracted data portions to an evaluation. More specifically, the manager (152) subjects each data portion to a mathematical evaluation, e.g. calculation, and attaches a numerical value, e.g. score, to each evaluated data portion. The manager (152) utilizes metadata characteristics, also known as meta-characteristics, to quantify aspects of the data portions, which are then utilized in the evaluation. Meta-characteristics may include, but are not limited to, document title, chapter title, section title, location within a chapter, location within a section, and highlighting. Details of the calculation and how the data portion is assessed is shown and described in detail in FIGS. 3A and 3B. Accordingly, the manager (152) is responsible for text extraction and text evaluation.

The director (154) is shown operatively coupled to the manager (152) and the knowledge base (160). The director (154) is responsible for selectively identifying a subset of the data portions extracted by the manager (152). More specifically, the director (154) conducts the selective identification based on the respectively attached score, e.g. mathematical evaluation. For example, in one embodiment, the director (154) assigns an execution priority value to each of the data portions based on their attached score. The director (154) is responsible for executing enrichment processing to an identified subset based on the calculated score. To be clear, the director (154) ensures that the enrichment processing is selectively executed on a subset of data portions, as opposed to the document in its entirety. Enrichment processing of data portions creates an indexed subset of that data portion. As shown herein, document$_A$ ($162_A$) is shown with multiple data portions, including portions ($164_{A,1}$), ($164_{A,2}$), and ($164_{A,N}$), and each data portion is shown with a corresponding indexed subset shown herein as subset$_{A,1}$ ($166_{A,1}$), subset$_{A,2}$ ($166_{A,2}$), and subset$_{A,N}$ ($166_{A,N}$). Documents$_B$ ($162_B$) and Documents$_N$ ($162_N$) may also be processed into data portions and indexed subsets. In one embodiment, each subset corresponds to a respective data portion of a document. In the example shown herein, each data portion is shown with an indexed subset, although in one embodiment, a sub-set of the data portions may have a corresponding indexed subset. Similarly, in one embodiment, following indexing of each data portion of a document, the director (154) may selectively and/or sequentially merge the indexed subsets to create a single index for the document thereby effectively linking or joining select indexed subsets. The single index may include all of the subsets or a selection of the subsets. In one embodiment, the index merging may be subject to size constraints, with the indexed subsets limited by their respective sizes. Accordingly, as each data portion of a document is subject to enrichment, a corresponding indexed subset of the data portion is created to support query processing.

As shown and described herein, subjecting a large document to enrichment and indexing is expensive and burdensome. The manager (152) and director (154) function to partition the document, effectively creating at least two partitions, e.g. data portions, and selectively and individually subjecting the data portions to enrichment and indexing. The documents ($162_A$)-($162_N$) may be partitioned based on one or more factors. For example, in one embodiment, the documents may be partitioned by topics or sub-topics, chapters, section, etc., without consideration of stop word identification and removal. Accordingly, the manager (152) functions to manage division of documents while provide structure and value to the data.

Documents and files may be communicated to the server (110) across the network (105). For example, in one embodiment, one or more documents or files may be communicated to the server (110) from nonvolatile data store (190a). The manager (152) processes documents, whether from the knowledge base (160) or across the network (105). In one embodiment, the manager (152) assigns a weight, e.g. mathematical factor, to the documents subject to processing based on their storage location. Similarly, it is understood that different documents or files may include textual and/or non-textual data, and it is further understood that the textual data of different documents or files may have different formats. The manager (152) may subject the score calculation to a variation based on the document or file formats. For example, document$_A$ with format$_A$ may have a formatting factor$_A$ applied to the score calculation, while document$_B$ with format$_B$, different from format$_A$, may have a formatting factor$_B$ applied to the score calculation.

The processing shown and described herein as supported by the knowledge engine (150) and its embedded manager (152) and director (154) is directed at textual data, which in one embodiment is structured text. In one embodiment, the document subject to processing may have one or more data portions having unstructured text. The manager (152) identifies the data portions of the document with unstructured text, and translates the unstructured text to structured text. Accordingly, as part of the data extraction process from the respective data portions, the manager (152) identifies the structure of the underlying data, and selectively subjects the underlying to a translation process to translate unstructured text to structured text.

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
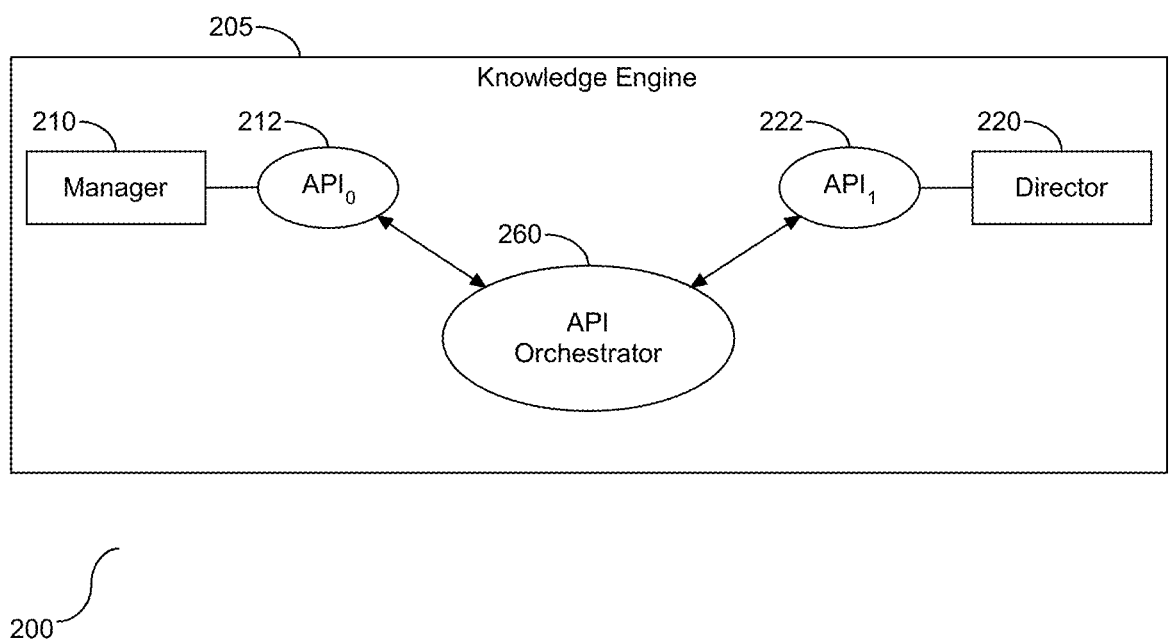
FIG. 2 depicts a block diagram a block diagram is provided illustrating the enrichment and indexing tools shown in FIG. 1 and their associated APIs.

An Application Program Interface (API) is understood in the art as a software intermediary between two or more applications. With respect to the document processing system shown and described in FIG. 1, one or more APIs may be utilized to support one or more of the manager (152) and director (154) and their associated functionality. Referring to FIG. 2, a block diagram (200) is provided illustrating the document processing tools and their associated APIs. As shown, a plurality of tools are embedded within the knowledge engine (205), with the tools including the manager (210) associated with $API_0$ (212), and the director (220) associated with $API_1$ (222). Each of the APIs may be implemented in one or more languages and interface specifications. $API_0$ (212) provides for text extraction and evaluation; and $API_1$ (222) provides selective subset identification and enrichment and indexing processing. As shown, each of the APIs (212) and (222) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

The embodiments described herein are directed at text extraction from a document or file, with the extraction configured to support a document query. To provide additional details for an improved understanding of selected embodiments of the present disclosure, reference is now made to FIGS. 3A and 3B which together illustrate a flow chart (300) demonstrating text extraction and processing of the extracted text. The variable $X_{Total}$ is assigned to the quantity of documents that are subject to extraction and processing (302), and a document counting variable, X, is initialized (304). Each document in a repository or library of documents has an associated weight that is aligned with document meta-information. The following table, Table 1, is an example of document meta-information and associated document weighting:

TABLE 1

| Meta-Information | Weight |
|---|---|
| Document is located in the server department | 2 |
| Document in location in the server shared by all entities | 1 |
| Document is located in Internet | 0.8 |
| Document was updated more than 30 days ago | 0.5 |
| Document was updated more than 1 year ago | 0.3 |

In this example, the weight is a factor of the document location or document age, which is merely an example and should not be considered limiting. For each document, $document_X$, subject to processing, the weight of the document is identified from the document meta-information (306). Following step (306), the document counting variable is incremented (308), and it is then determined if each of the documents has been processed to identify the corresponding meta-information (310). A negative response to the determination at step (310) is following by a return to step (306), and a positive response concludes the initial document process for text extraction. In one embodiment, the meta-information identification shown herein may be conducted statically or dynamically, e.g. in real-time with the text extraction and processing. Accordingly, as shown herein, at least part of the text extraction processing includes document meta-information extraction and/or identification.

Following step (310), the document counting variable, X, is re-initialized (312), and a corresponding sentence counting variable, Y, is initialized (314). $Sentence_Y$ is extracted from $document_X$ (316). As shown herein, sentence extraction takes place from the beginning of the document, although the extraction order shown herein should not be considered limiting. In one embodiment, the extraction may take place in a different order. Each extracted sentence has a corresponding sentence identifier, which in one embodiment is a sequential number to identify the sentence. Following step (316), the identifier, $ID_Y$, is created or obtained, and assigned to $sentence_Y$ (318). In addition, a score, $score_A$, is assigned to extracted $sentence_Y$ (320). The score is directed at meta-information of the extracted sentence. The following table, Table 2, is an example of document meta-information and associated document weighting:

TABLE 2

| Component | $Score_A$ |
|---|---|
| Title | 100 |
| Title of Chapter | 50 |
| Title of Section | 30 |
| First sentence in Chapter | 20 |
| First sentence in Section | 10 |
| Sentence with bold characters | 5 |
| Others | 1 |

The example sentence scoring shown in Table 2 is directed at sentence meta-information, such as the position of the sentence within the document, and other sentence characteristics. The scores are an example of a weight assigned to the sentence based on the sentence meta-information. The components and corresponding scores are examples to demonstrate sentence extraction and evaluation, and should not be considered limiting. Accordingly, as each sentence is extracted from the document and subject to processing, initial sentence characteristic data is ascertained and a score corresponding to the characteristic data is associated with or assigned to the sentence.

The meta-information is referred to herein as $score_1$. Using the meta-information for the extracted sentence, a score, referred to herein as $score_Y$, for the extracted sentence is calculated as the product of $score_A$ and the weight (322). Following the calculation at step (322), the sentence, $sentence_Y$, with the identifier, $ID_Y$, $score_Y$, and the number of characters in $sentence_Y$ are stored (324), followed by incrementing the sentence counting variable (326). A determination is conducted to assess if the scores have been calculated for each sentence (328). A negative response to the determination at step (328) is followed by a return to step (316), and a positive response concludes the sentence score calculation. In one embodiment, the score calculation takes place together with text extraction. Similarly, in one embodiment $score_Y$ is referred to as a priority value. Following a positive response at step (328), the document counting variable, X, is incremented (330), and it is determined if each of the documents has been processed with respect to sentence identification and extraction (332). A negative response to the determination at step (332) is followed by a return to step (314), and a positive response concludes the sentence extraction process. Accordingly, each sentence in the document is assessed a score based on two factors, including $score_1$ and the weight.

The text extraction shown and described herein occurs from the beginning of each sentence of a specified document. Extracted sentences are stored and/or organized into a data structure, together with their respective identifier. In one embodiment, the quantity of characters in each sentence is attained and represented in the data structure. The following table, Table 3, is an example of a data structure to store document meta information and associated document weighting:

TABLE 3

| Identifier | Score | Number of Characters | Text |
|---|---|---|---|
| 1 | 100*0.5 = 50 | 17 | Example Sentence$_1$ |
| 2 | 50*0.5 = 25 | 14 | Example Sentence$_2$ |
| 3 | 20*0.5 = 10 | 25 | Example Sentence$_3$ |
| 4 | 1 * 0.5 = 0.5 | 30 | Example Sentence$_4$ |

The Score in Table 3 is assessed as a product of $Score_1$ from Table 2 and the weight from Table 1. As shown in Table 3, the extracted sentences are part of a document that was updated more than 30 days ago. Accordingly, the sentences are extracted from the document and assessed, with the score assigned being calculated at the time of the text extraction and stored in a corresponding or assigned data structure.

Figure 4A:
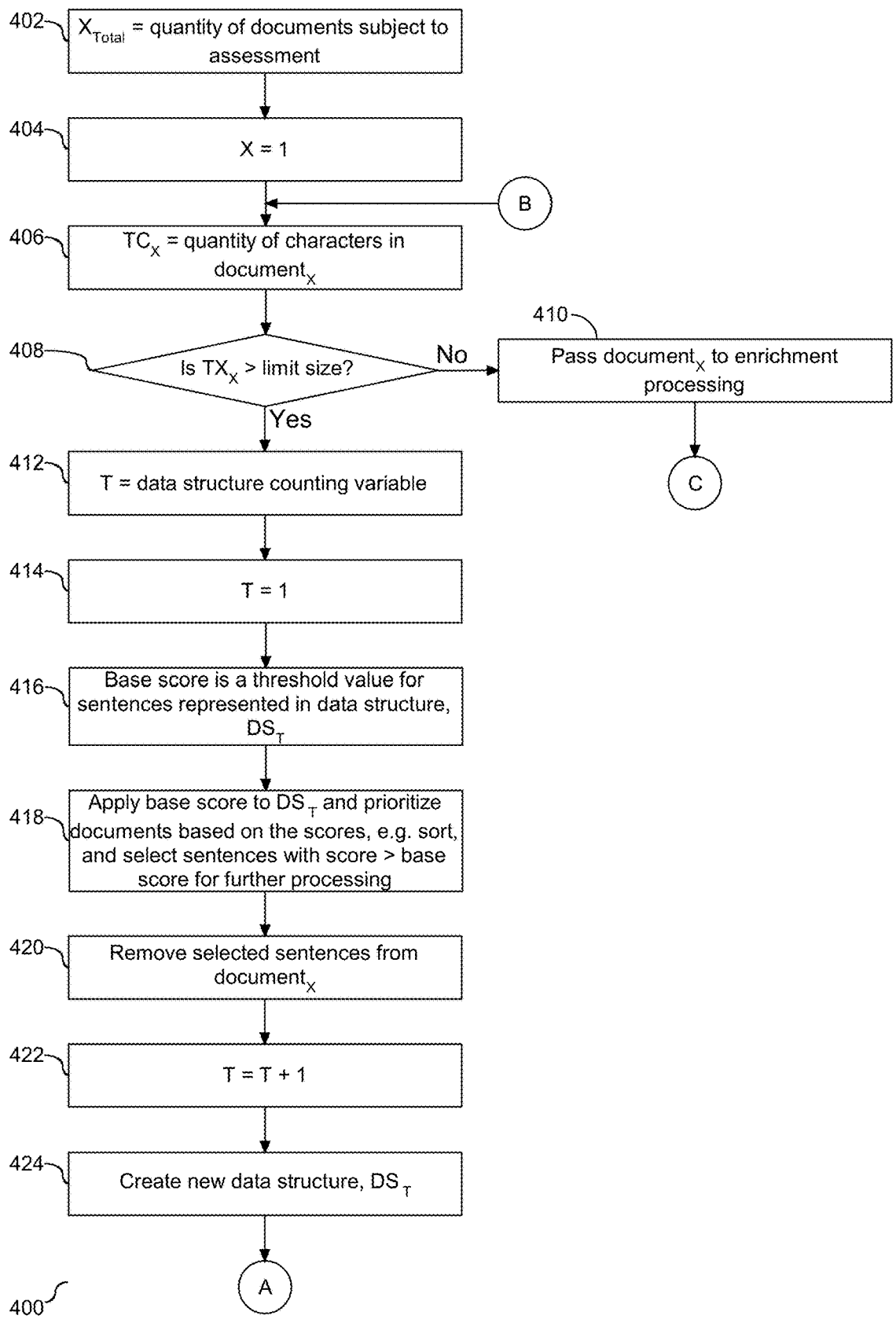
FIGS. 4A and 4B together depict a flow chart illustrating a process for document processing of one or more select subsets of portions of the document.
Figure 4B:
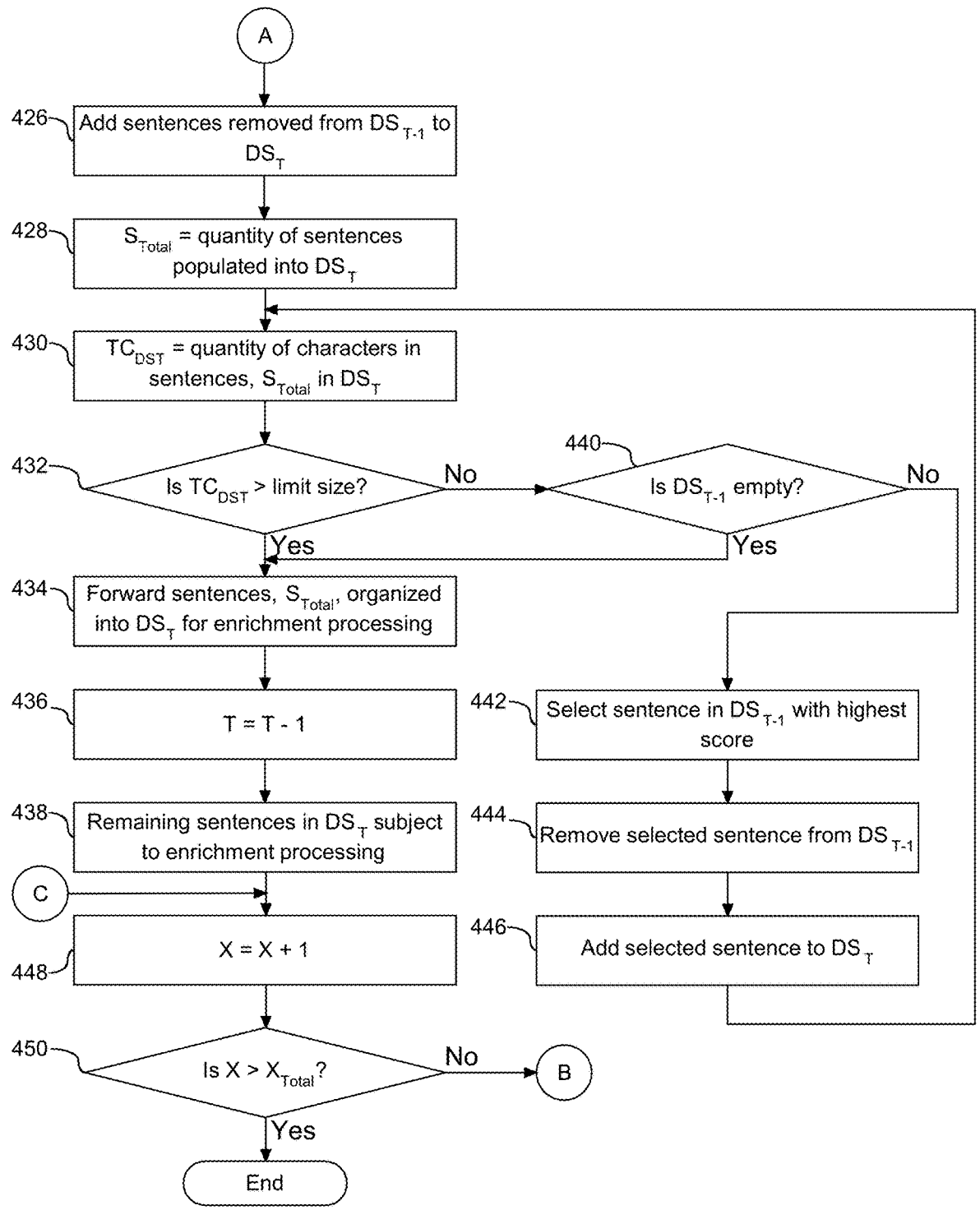

Referring to FIGS. 4A and 4B, a flow chart (400) is provided to illustrate document processing to one or more select subsets of portions of the document. Similar to FIGS. 3A and 3B, the variable $X_{Total}$ represents the quantity of documents that are subject to assessment (402), and a corresponding document counting variable, X, is initialized (404). The variable $TC_X$ represents the total quantity of characters in document$_X$ (406). In one embodiment, the $TC_X$ is obtained as a summation of the quantities represented in the third column of Table 3. It is then determined if the total quantity of characters, $TC_X$, is greater than the LimitSize (408), where LimitSize represents a size limitation for subjecting the sentences to enrichment processing. The goal is to selectively process sentences within a document. In one embodiment, LimitSize is a configurable value, either statically or dynamically configurable. A positive response to the determination at step (408) is an indication that the document in its entirety is too large for enrichment processing, e.g. the burden on the CPU and memory is excessive. However, a negative response to the determination at step (408) is an indication that the enrichment processing is not too burdensome, and the document, document$_X$, is passed on to enrichment processing (410). Accordingly, the LimitSize functions as a threshold value that corresponds to the burden placed on the CPU and memory for enrichment processing.

A positive response to the determination at step (408) is an indication that the document, document$_X$, needs to be selectively pruned. Different aspects of characteristic data may be employed for the pruning. The variable T represents a data structure counting variable, with the data structure representing and organizing the document sentences based on sentence properties and sentence meta-data (412). The variable T is initialized (414). All of the sentences in document$_X$ are represented in a corresponding data structure, $DS_T$, see Table 3. A base score represents a threshold score for the sentences represented in $DS_T$ (416). In one embodiment, the base score is a configurable value, either statically or dynamically. The base score is applied to $DS_T$, and all sentences represented in $DS_T$ are subject to prioritization, e.g. sorting, with respect to the base score, with all sentences having a score greater than the base score being selected for further processing (418) and removed from document$_X$ (420). The data structure counting variable, T, is incremented (422), a new data structure, $DS_T$, is created (424), and the sentences removed from $DS_{T-1}$ are added to the new data structure, $DS_T$, (426). In addition, the variable $S_{Total}$ is assigned to the quantity of sentences populated into $DS_T$ (428). As shown in Table 3, the data structure includes a character count. The quantity of characters among all of the sentences, $S_{Total}$, in the new data structure, $DS_T$, is assigned to the variable $TC_{DST}$ (430).

Similar to the assessment shown at step (408), it is determined if the total quantity of characters, $TC_{DST}$, is greater than the LimitSize (432), where LimitSize represents the size limitation for subjecting the sentences populated in $DS_T$ to enrichment processing. A positive response to the determination at step (432) is followed by forwarding the sentence(s), $S_{Total}$, populated and organized into $DS_T$ for enrichment processing (434). Following step (434), or in one embodiment after a set amount of time has passed, the data structure counting variable T is decreased (436), and the sentences remaining in $DS_T$ are subject to enrichment processing (438). However, a negative response to the determination at step (442) is an indication that there is space available to selectively move one or more sentences into $DS_T$ for enrichment processing, e.g. selectively move one or more lower priority sentences to enrichment processing. It is determined if the data structure, $DS_{T-1}$ has any sentences remaining, e.g. is the data structure empty, (440). A positive response to the determination at step (440) is followed by a return to step (434). However, a negative response to the determination at step (440) is followed by selecting the sentence remaining in $DS_{T-1}$ with the highest score (442), removing the selected sentence from $DS_{T-1}$ (444), adding the selected sentence to $DS_T$ (446), and returning to step (430).

The enrichment processing shown and described herein takes place on the granular level of sentences within a document or file, with each file separately processed. Following steps (410) or (438), the document counting variable is incremented (448), and it is determined if each of the files or documents have been subject to enrichment processing (450). A negative response to the determination at step (450) is followed by a return to step (406), and a positive response concludes the enrichment processing. Although shown on the granularity of documents and sentences, these parameters should not be considered limiting. In one embodiment, the granularity may be set by words, phrases, characters, etc. Accordingly, as shown and described, documents and files, and the sentences therein are subject to characterization in preparation for enrichment processing.

As shown and described in FIGS. 4A and 4B, documents or selected sentences of data from a document are selectively subject to enrichment processing. Elements of enrichment processing include, but are not limited to, word extraction, indexing, etc. In one embodiment, word extraction is an example that utilizes natural language processing (NLP) technology. Other examples of enrichment processing may include, but is not limited to, context extraction, keyword extraction, etc., which in one embodiment may utilize NLP technology.

The tools shown in FIG. 1, together with the associated processes and functionality shown in the flow charts of FIGS. 3A and 3B, FIGS. 4A, and 4B, illustrate use of a computer implemented intelligent agent, e.g. knowledge engine, to conduct or facilitate document enrichment and indexing.

With references to FIG. 5, a block diagram (500) is provided illustrating an example of a computer system/server (502), hereinafter referred to as a host (502) in communication with a cloud based support system, to implement the system and processes described above with respect to FIGS. 1-4B. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (510) where tasks are performed by remote processing devices that are linked through a communications network. In a distributed cloud computing environment, program modules may be located in both local and remote computer system storage media including memory storage devices.

Figure 5:
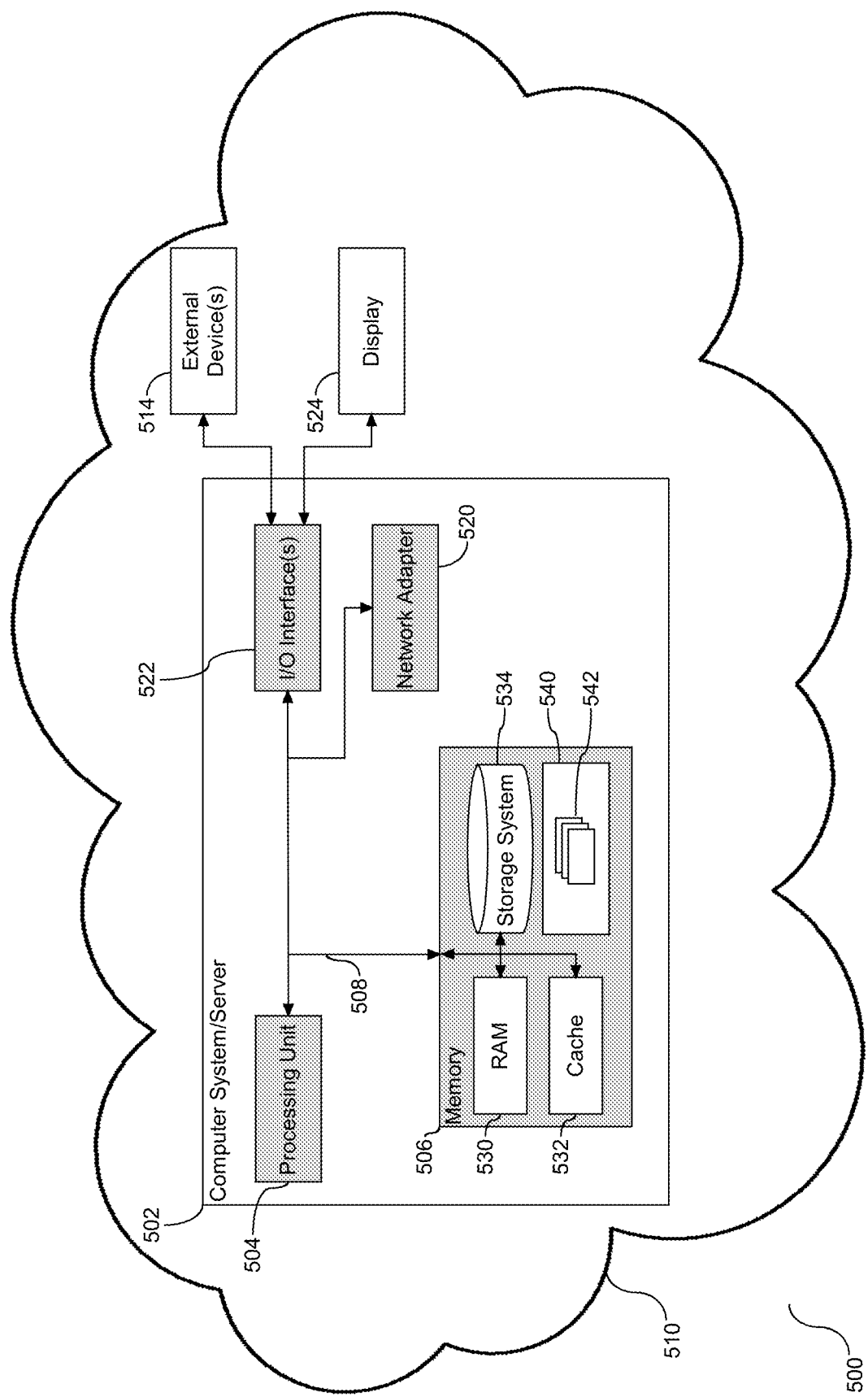
FIG. 5 is a block diagram depicting an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the adversarial training and dynamic classification model evolution. For example, the set of program modules (542) may include the modules configured as the tools (152)-(154) described in FIG. 1.

Host (502) may also communicate with one or more external devices (514), such as a keyboard, a pointing device, a sensory input device, a sensory output device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
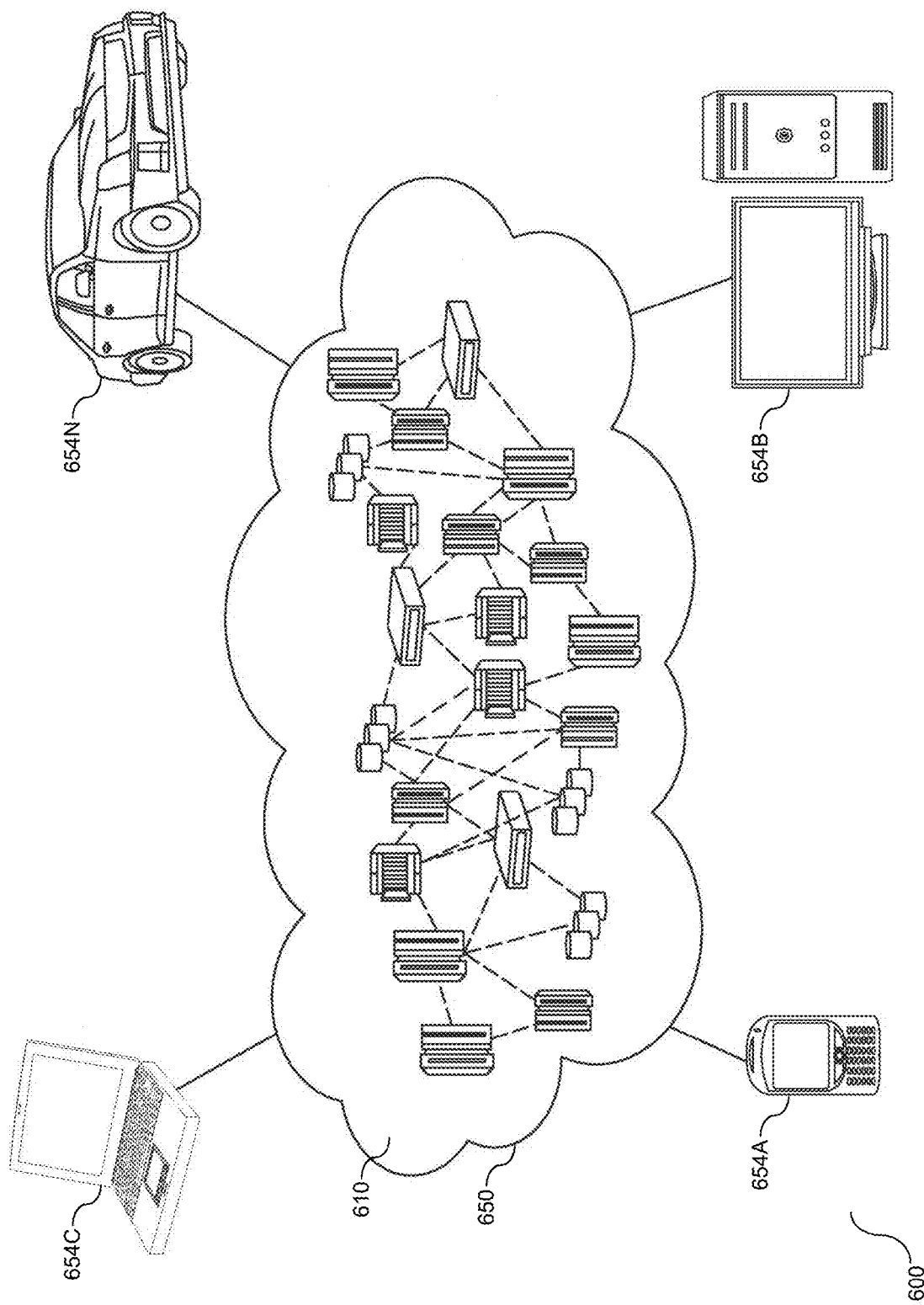
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
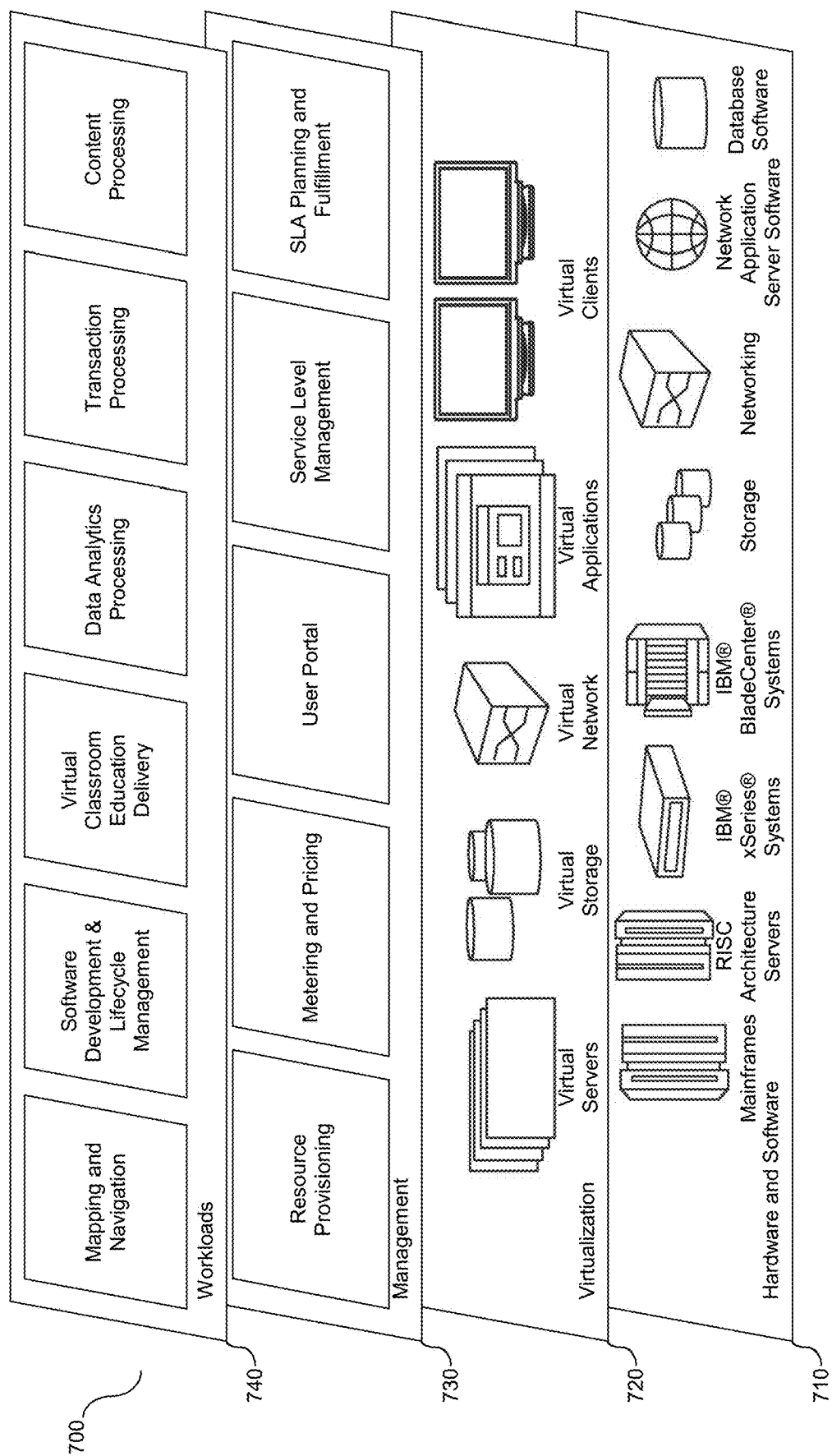
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and content processing.

The system and flow charts shown herein may also be in the form of a computer program device for use with an intelligent computer platform in order to facilitate document enrichment and indexing. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of document enrichment and indexing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the document enrichment and indexing may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
a processing unit operatively coupled to memory;
a knowledge engine in communication with the processing unit and memory, the knowledge engine comprising:
a manager to extract text from a document, the extracted text including one or more data portions;
the manager to evaluate the extracted text, including calculate a score for each of the one or more extracted data portions, the calculation based on meta characteristic data associated with a position of the one or more data portions in the document and a weight;
a director operatively coupled to the manager, the director to selectively identify a subset of the extracted one or more data portions of the extracted text, the identification based on the calculated score; and
the director to execute enrichment processing based on the calculated score, wherein the enrichment processing is limited to the identified subset; and
an indexed subset of the one or more data portions returned from the director following execution of the enrichment processing.

2. The computer system of claim 1, wherein the selective identification of a subset further comprises the director to assign an execution priority value to each portions of the identified subset, and execute enrichment processing responsive to the assigned priority.

3. The computer system of claim 1, further comprising the manager to process two or more documents from two or more separate storage locations, wherein the weight of each of the two or more documents is based on their storage location, an age of the document, or a combination thereof.

4. The computer system of claim 1, wherein the processed document includes textual data, and score calculation is subject to variation based on document file format.

5. The computer system of claim 1 wherein the meta-characteristic data is selected from the group consisting of: document title, chapter title, section title, location within a chapter, location within a section, and highlighting.

6. The computer system of claim 1, further comprising the manager to identify a select portion within the document having unstructured text, and further comprising the manager to translate the unstructured text to structured text.

7. A computer program product to process textual data, the computer program product comprising a computer readable storage device having program code embodied therewith, the program code executable by a processing unit to:
process a document, including extract text from a document, the extracted text including one or more data portions;
evaluate the extracted text, including calculate a score for each of the extracted one or more data portions, the calculation based on meta characteristic data associated with a position of the one or more data portions in the document and a weight;
selectively identify a subset of the extracted one or more data portions of the extracted text based on the calculated score; and execute enrichment processing based on the calculated score, wherein the enrichment processing is limited to the identified subset, and an indexed subset of the one or more data portions is returned from execution of the enrichment processing.

8. The computer program product of claim 7, wherein the program code to selectively identify a subset further comprises program code to assign an execution priority value to each portions of the identified subset, and execute enrichment processing responsive to the assigned priority.

9. The computer program product of claim 7, further comprising program code to process two or more documents from two or more separate storage locations, wherein the weight of each of the two or more documents is based on their storage location, an age of the document, or a combination thereof.

10. The computer program product of claim 7, wherein the processed document includes textual data, and score calculation is subject to variation based on document file format.

11. The computer program product of claim 7, wherein the meta characteristic data is selected from the group consisting of: document title, chapter title, section title, location within a chapter, location within a section, and highlighting.

12. The computer program product of claim 7, further comprising program code to identify a select portion within the document having unstructured text, and further comprising program code to translate the unstructured text to structured text.

13. A method for processing textual data, comprising:
  document processing, including extracting text from a document, the extracted text including one or more data portions;
  evaluating the extracted text, including calculating a score for each of the extracted one or more data portions, the calculation based on meta characteristic data associated with a position of the one or more data portions in the document and a weight;
  selectively identifying a subset of the extracted one or more data portions of the extracted text based on the calculated score; and
  executing enrichment processing based on the calculated score, wherein the enrichment processing is limited to the identified subset, and an indexed subset of the one or more data portions is returned from execution of the enrichment processing.

14. The method of claim 13, wherein selectively identifying a subset further comprises assigning an execution priority value to each portions of the identified subset, and executing enrichment processing responsive to the assigned priority.

15. The method of claim 13, further comprising processing two or more documents from two or more separate storage locations, wherein the weight of each of the two or more documents is based on their storage location, an age of the document, or a combination thereof.

16. The method of claim 13, wherein the processed document includes textual data, and score calculation is subject to variation based on document file format.

17. The method of claim 13, wherein the meta characteristic data is selected from the group consisting of: document title, chapter title, section title, location within a chapter, location within a section, and highlighting.

18. The method of claim 13, further comprising identifying a select portion within the document having unstructured text, and further comprising translating the unstructured text to structured text.

* * * * *